Aug. 21, 1951 R. M. MANNING 2,565,180
TUBULAR DROP CHAMBER AND AN ARRESTOR
Filed Nov. 19, 1948 2 Sheets-Sheet 1
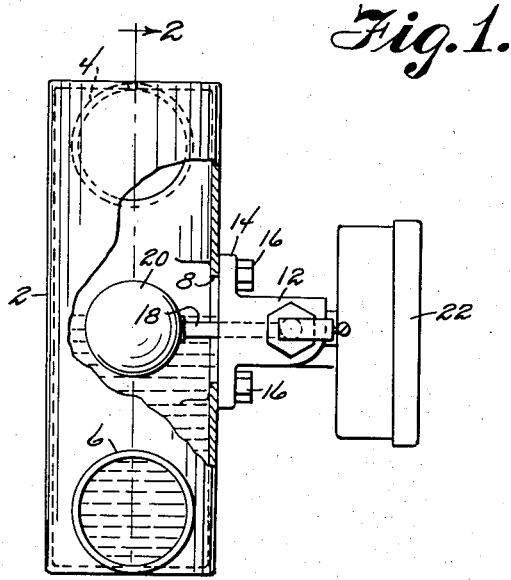
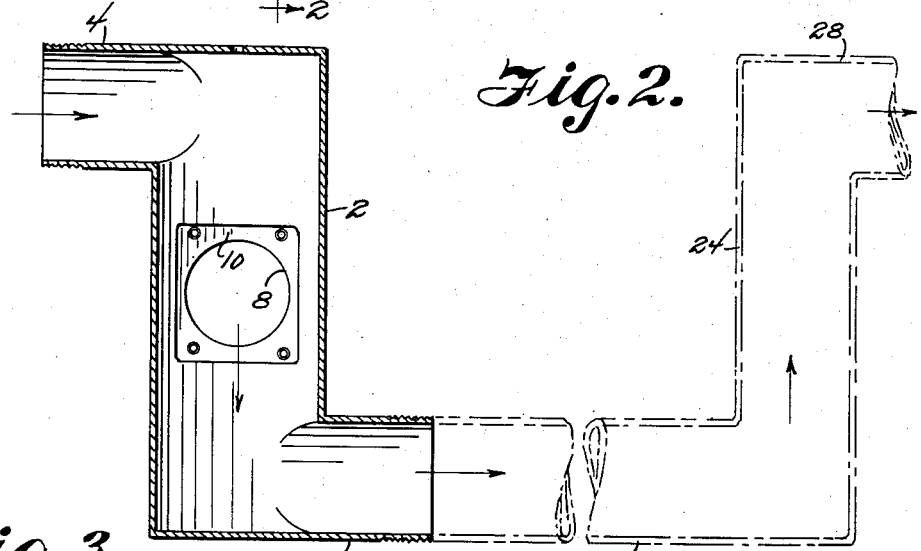
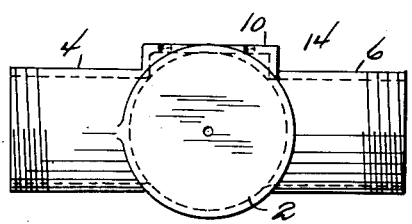
INVENTOR.
Robert M. Manning
BY Victor J. Evans & Co.
ATTORNEYS

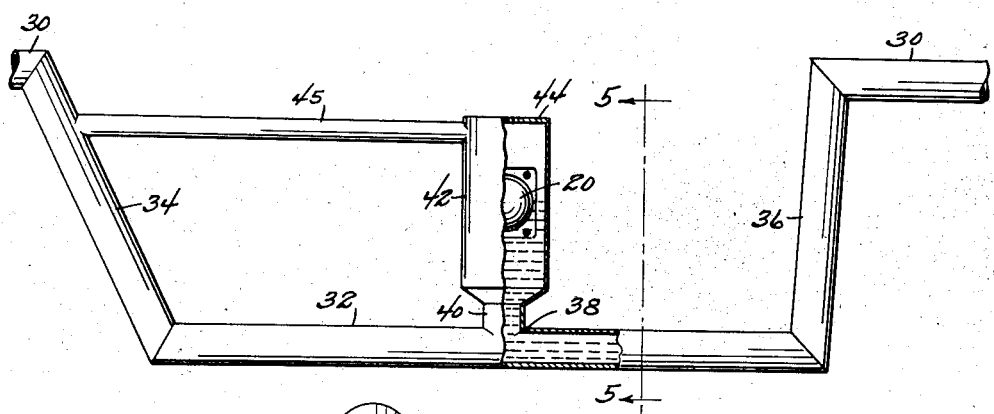
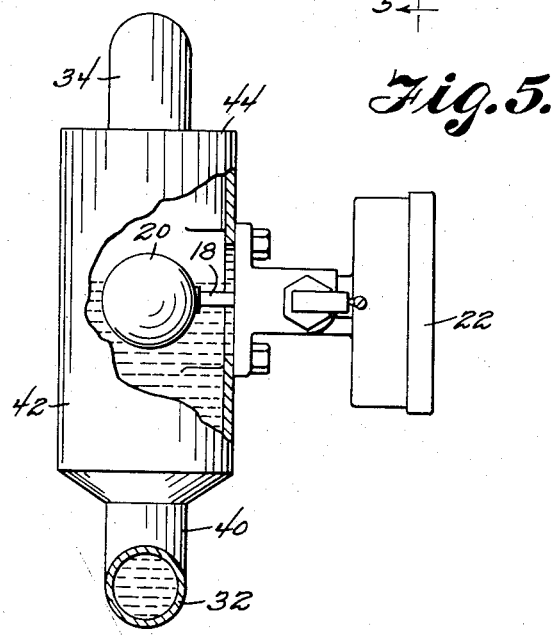

Patented Aug. 21, 1951

2,565,180

UNITED STATES PATENT OFFICE 2,565,180

TUBULAR DROP CHAMBER AND AN ARRESTOR

Robert M. Manning, Pampa, Tex.

Application November 19, 1948, Serial No. 60,971

2 Claims. (Cl. 137—68)

My present invention relates to an improved tubular drop trap chamber and an arrestor of the type especially adapted for use in oil pipe lines and designed for use therein in connection with mercury switches electrically connected so that the operation of the float in the chamber will open or close the switch to operate a pump or other suitable device which may be necessary in the movement of oil.

Customarily float controls are located at spaced points in the line but the float action is not efficient because the vacuum movement of the oil by the pumps does not move the oil in a solid body filling the pipe line, but tends to string out the flow so that the line is not filled. The floats will not operate properly with less than a full tube, and it is the purpose of my invention to insure a full tube at the point of location of the float chamber.

In the accompanying drawings I have illustrated one complete example of the physical embodiment of my invention according to the best mode I have thus far devised, but it will be understood that various changes and alterations may be made in the exemplified structure within the scope of the appended claims.

In the drawings:

Figure 1 is a vertical sectional view of the drop chamber taken at line 1—1 of Figure 2.

Figure 2 is a longitudinal vertical sectional view of the drop chamber and arrestor with the switch removed.

Figure 3 is a top plan view of the drop chamber.

Figure 4 is a front elevational view of a modified form of the drop chamber partially broken away for clarity of observation.

Figure 5 is a sectional view thereof taken at line 5—5 of Figure 4.

Referring now to the drawings wherein I have illustrated the present preferred form of my invention, I employ a vertically disposed cylinder 2 of suitable material such as metal, provided with an integral upper angular threaded outlet tube 4 and a lower angular threaded outlet tube 6. An opening 8 in the cylinder 2 has a squared frame plate 10 to which is secured the support 12 by means of the flange 14 and bolts 16.

The float arm 18 extends through the support and float 20 on the arm is positioned within the cylinder, the float arm actuating the mercury switch 22 to control an electrical circuit.

The arrestor comprises a vertically disposed tube 24 formed with an integral connecting elbow 26 for attaching to the outlet tube 6, and an upper angular outlet tube 28.

It is understood, of course, that the connected drop trap chamber and the arrestor are used in conjunction with each other and are positioned in a conventional oil pipe line.

In Figures 4 and 5, I have illustrated a modified form of the invention wherein the pipe line 30 has a dropped section formed with a horizontal pipe 32 connected by the inclined section 34 and the vertical section 36 to the pipe line. The pipe section 32 is tapped at 38 to receive the neck 40 of cylinder 42 which provides a float chamber closed at the top as at 44, the top of float travel being located below the pipe line 30.

A float arm 18 and float 20 coact with a switch 22 similar to the mechanism described above, and of course if the flow of oil fails, the level drops in the cylinder 42, and the switch will be actuated by the float to control the pumps.

The operation of the device is believed obvious and it will be clear that as the oil is drawn through the device of my invention by a pump not shown, the flow will be arrested and the oil will back up to properly operate the float, and of course, should the oil supply fail at the inlet side in the first described form of the invention, the oil level will be reduced by pump action in the chamber so that the float will lower.

As shown in Figure 4, the upper end of the chamber 42 is connected by a pipe 45 to the inclined section 34 of the pipe line 30. This connection insures the venting of the upper end of the chamber 42 when the oil recedes in pipe line section 34, and it also insures the free movement of the float 20.

Having thus fully described my invention what I claim as new and desire to secure by Letters Patent is:

1. In a drop trap chamber and arrestor for a pipe line, the combination which comprises a horizontally disposed pipe section positioned in a plane below the plane of the pipe line, a vertical pipe section connecting one end of the horizontal pipe to the pipe line, an inclined pipe section connecting the opposite end of the horizontal pipe to the pipe line, a vertically positioned float chamber extended upwardly from said horizontal pipe and positioned midway between the ends thereof, said float chamber having a float receiving opening in one side positioned midway of the height thereof and below the said pipe line, and a by-pass from the upper end of the float chamber to the pipe line.

2. In a drop trap chamber and arrestor for a pipe line, the combination which comprises a horizontally disposed pipe section positioned in a plane below the plane of the pipe line, a vertical pipe section connecting one end of the horizontal pipe to the pipe line, an inclined pipe section connecting the opposite end of the horizontal pipe to the pipe line, a vertically positioned float chamber extended upwardly from said horizontal pipe and positioned midway between the ends thereof, said float chamber having a float receiving opening in one side positioned midway of the height thereof and below the said pipe line, and a bypass from the upper end of the float chamber to the said inclined pipe section.

ROBERT M. MANNING.

REFERENCES CITED

The following references are of record in the file of this patent:

UNITED STATES PATENTS

| Number | Name | Date |
|---|---|---|
| Re. 20,380 | Hickstein et al. | May 25, 1937 |
| 1,602,279 | Manning | Oct. 5, 1926 |
| 1,643,818 | Manning | Sept. 27, 1927 |
| 2,045,909 | Haralson | June 30, 1936 |
| 2,055,501 | Morrow | Sept. 29, 1936 |
| 2,137,880 | Loesser | Nov. 22, 1938 |